US006935758B2

(12) United States Patent
Plaster (10) Patent No.: US 6,935,758 B2
(45) Date of Patent: Aug. 30, 2005

(54) DRIVER OBSERVATION SYSTEM

(76) Inventor: Morgan Plaster, 831 Cherokee, New Orleans, LA (US) 70118

( * ) Notice: Subject to any disclaimer, the term of this patent is extended or adjusted under 35 U.S.C. 154(b) by 0 days.

(21) Appl. No.: 10/704,898

(22) Filed: Nov. 10, 2003

(65) Prior Publication Data

US 2005/0099706 A1    May 12, 2005

(51) Int. Cl.⁷ .................................................. G02B 5/08
(52) U.S. Cl. ...................................................... 359/850
(58) Field of Search ................................ 359/435, 850, 359/838, 856, 857, 858

(56) References Cited

U.S. PATENT DOCUMENTS

| 1,478,650 A | 12/1923 | Hallengren |
| 1,617,270 A | 2/1927 | Paul |
| 1,649,083 A | 3/1927 | Ruth |
| 1,635,011 A | 7/1927 | Sadler |
| 1,644,902 A | 10/1927 | Voigt |
| 1,745,862 A | 2/1930 | O'Rourke |
| 2,103,858 A | 12/1937 | Luschinsky |
| 2,501,067 A | 3/1950 | Lusebrink |
| 3,127,191 A | 3/1964 | Goldman |
| 3,394,978 A | 7/1968 | Muller |
| 3,682,536 A | 8/1972 | Whitman |
| 4,911,673 A | 3/1990 | Hollowell |
| 4,968,124 A * | 11/1990 | Deckert et al. ............. 359/435 |
| 5,666,227 A | 9/1997 | Ben-Ghiath |
| 6,055,098 A | 4/2000 | Lett |
| 6,250,766 B1 | 6/2001 | Strumolo et al. |
| 6,357,883 B1 | 3/2002 | Strumolo et al. |

FOREIGN PATENT DOCUMENTS

GB      2 221 883 A     2/1990

* cited by examiner

Primary Examiner—Euncha P. Cherry
(74) Attorney, Agent, or Firm—Juan J. Lizarraga (57) ABSTRACT

A driver observation system for extending the driver's point of vision to the corners of a vehicle by optically transmitting forward, side and rear images from mirror assemblies receiving images at or near the front and rear corners of a vehicle through a series of mirrors and lens to the driver's view at the controls of the vehicle. The system is suitable for either front or rear or both front and rear applications, as well as left or right or both left and right and may be installed after factory manufacture of the vehicle as well as part of original manufacture.

9 Claims, 12 Drawing Sheets

DRIVER OBSERVATION SYSTEM

BACKGROUND OF THE INVENTION

The present invention relates to devices, assemblies and systems for enhancing the observation of a driver of any vehicle by extending the driver's point of vision to the corners of the vehicle by optically transmitting forward, side and rear images from the corners of the vehicle to a location within the vision of the driver at the controls of the vehicle.

With the ever increasing number of vehicles on the roads, streets and highways and the increasing number of larger vehicles, such as pick-up trucks, vans and sports utility vehicles, commonly known as SUVs, the ability of the driver of a vehicle, especially smaller vehicles such as sports cars and sedans, to see traffic conditions, whether on the side, in the rear or forward has been diminished. This is particularly so in those conditions where a driver is attempting to turn into an intersecting street, or back out of a parking spot, or trying to turn left from a turning lane across oncoming traffic. In all those instances the driver must extend the vehicle into traffic a sufficient length, usually almost half the length of the vehicle, so that the driver's line of vision covers the oncoming traffic. While most vehicles are equipped with rear view mirrors and there have been attempts to eliminate the "blind spot" behind the driver, the need to extend the driver's line of vision applies in all directions.

Likewise, because so many vehicles are already in use, there is a need to provide an enhancement or extension of the driver's line of vision to existing vehicles as well as those under manufacture. Such an enhancement would have broader application and use if it were a passive device and relatively small and unobtrusive.

Therefore, it would be clearly advantageous and would improve the safety of a vehicle if the line of vision of the driver were extended to the corners of the vehicle.

SUMMARY OF THE INVENTION

The main object of this invention is to improve safety and avoid accidents by extending the line of vision of a driver of a vehicle to the corners of the vehicle in forward, side and rear directions from corner mounted mirror assemblies through a series of mirrors and lens to the driver's view.

It is a further object of this invention that it be applicable to the front and rear of a vehicle and to the right and left side of a vehicle in any combination.

It is a further object of this invention that it be applicable to existing vehicles as well as vehicles under manufacture and the invention be installed either during manufacture or after and such installation be either internal or external to the body of a vehicle or a combination of both.

It is a further object of this invention that it be an optical device comprising a combination of mirrors and lens in series, and the location, size and configuration of said mirrors and lens shall be suitable to the vehicle upon which the invention is installed.

It is a further object of this invention that the lens made part of this invention may be, by way of example but not by limitation, either convex, double convex, converging or positive, concave, double concave, diverging or negative, or a combination of types as the particular application may require.

In accordance with the foregoing and other objectives of the invention, a new driver observation system for use with a driver-operated vehicle is provided. The driver observation system comprises; at least one corner mirror assembly at a front corner of the vehicle with a primary mirror to receive and reflect a light image not within the vision of the driver; a lens and mirror base assembly with a receiving end and a transmitting end, with a first lens interposed between the receiving end and the transmitting end to receive at least one light image from the front corner mirror assembly and at least one mirror to direct the light image through the lens and mirror base assembly from the receiving end to the transmitting end; a main lens base with a receiving side and a display side within the vision of the driver, with a second lens to receive the light image transmitted from the transmitting end of the lens and mirror base assembly, a final lens to receive the light image transmitted through the second lens and transmit the light image to the display side of the main lens base within the vision of the driver.

In a further embodiment of the embodiment detailed above, the driver observation system further comprises; a lens and mirror base assembly with a receiving end and a transmitting end, with a first lens in proximity of the receiving end to receive the light image reflected from the primary mirror in the corner mirror assembly, a first mirror to receive the light image from the first lens and transmit the light image, and at least a second mirror to receive the light image from the first mirror and transmit the light image through the lens and mirror base assembly and towards the transmitting end; and a main lens base with a receiving side and a display side within the vision of the driver, with a second lens to receive the light image transmitted from the transmitting end of the lens and mirror base assembly, a final lens to receive the light image transmitted through the second lens and transmit the light image to the display side of the main lens base within the vision of the driver.

In a further embodiment, the driver observation system further comprises; at least one corner mirror assembly at a rear corner of the vehicle with a primary mirror to receive and reflect a light image not within the vision of the driver; a rear lens base assembly with a receiving end and a display side with at least one lens interposed between the receiving end and the display side to receive at least one light image from the rear corner mirror assembly and at least one mirror to direct the light image through the rear lens base assembly, and a final lens to receive and transmit the light image to the display side of the rear lens base assembly within the vision of the driver.

In a further embodiment of the embodiment detailed above, the driver observation system further comprises; a rear lens assembly with a receiving end and a display side, with a first lens in proximity of the receiving end to receive the light image reflected from the primary mirror in the rear corner mirror assembly, a first mirror to receive and transmit the light image from the first lens, a second lens to receive the light image transmitted from the first mirror, a second mirror to receive and transmit the light image from the second lens, and a final lens to receive the light image from the second mirror and transmit the light image to the display side of the rear lens base assembly within the vision of the driver.

In a further alternative embodiment of this invention a driver observation system for use with a driver operated vehicle is provided, where the driver observation system comprises; at least one corner mirror assembly at a front corner of the vehicle with a primary mirror to receive and reflect a first light image not within the vision of the driver where the corner mirror assembly has a covering with an upper planar side; a periscope assembly with a top end and a bottom end, with said bottom end attached to and through the upper planar side of the corner mirror assembly covering, with the top end rising above the upper planar side of the corner mirror assembly covering, with a top mirror mounted in the periscope assembly at the top end to receive a second light image not within the vision of the driver and from a different direction than the first light image received by the primary mirror within the corner mirror assembly, with a bottom mirror mounted at the bottom end of the periscope assembly within the corner mirror assembly to receive the second light image reflected from the top mirror and transmit the second light image in the same direction and path as the first light image reflected from the primary mirror; a lens and mirror base assembly with a receiving end and a transmitting end, with a first lens in proximity of the receiving end to receive the first light image reflected from the primary mirror in the corner mirror assembly and the second light image reflected from the bottom mirror of the periscope, a first mirror to receive the first and second light images from the first lens and transmit the first and second light images, and at least a second mirror to receive the first and second light images from the first mirror and transmit the first and second light images through the lens and mirror base assembly and towards the transmitting end; a main lens base with a receiving side and a display side within the vision of the driver, with a second lens to receive the first and second light images transmitted from the transmitting end of the lens and mirror base assembly, a final lens to receive the first and second light images transmitted through the second lens and transmit the first and second light images to the display side of the main lens base within the vision of the driver.

In a further alternative embodiment of the embodiment detailed above, the driver observation system further comprises; at least one corner mirror assembly at a rear corner of the vehicle with a primary mirror to receive and reflect a light image not within the vision of the driver; a rear lens assembly with a receiving end and a display side, with a first lens in proximity of the receiving end to receive the light image reflected from the primary mirror in the rear corner mirror assembly, a first mirror to receive and transmit the light image from the first lens, a second lens to receive the light image transmitted from the first mirror, a second mirror to receive and transmit the light image from the second lens, and a final lens to receive the light image from the second mirror and transmit the light image to the display side of the rear lens base assembly within the vision of the driver.

According to another embodiment of this invention, a driver observation system for use with a driver operated vehicle is provided, where the driver observation system comprises; at least one corner mirror assembly at a rear corner of the vehicle with a primary mirror to receive and reflect a light image not within the vision of the driver; a rear lens base assembly with a receiving end and a display side with at least one lens interposed between the receiving end and the display side to receive at least one light image from the rear corner mirror assembly and at least one mirror to direct the light image through the rear lens base assembly, and a final lens to receive and transmit the light image to the display side of the rear lens base assembly within the vision of the driver.

In an alternative embodiment of the embodiment detailed above, the driver observation system further comprises, a rear lens assembly with a receiving end and a display side, with a first lens in proximity of the receiving end to receive the light image reflected from the primary mirror in the rear corner mirror assembly, a first mirror to receive and transmit the light image from the first lens, a second lens to receive the light image transmitted from the first mirror, a second mirror to receive and transmit the light image from the second lens, and a final lens to receive the light image from the second mirror and transmit the light image to the display side of the rear lens base assembly within the vision of the driver.

DETAILED DESCRIPTION OF THE INVENTION

Figure 1:
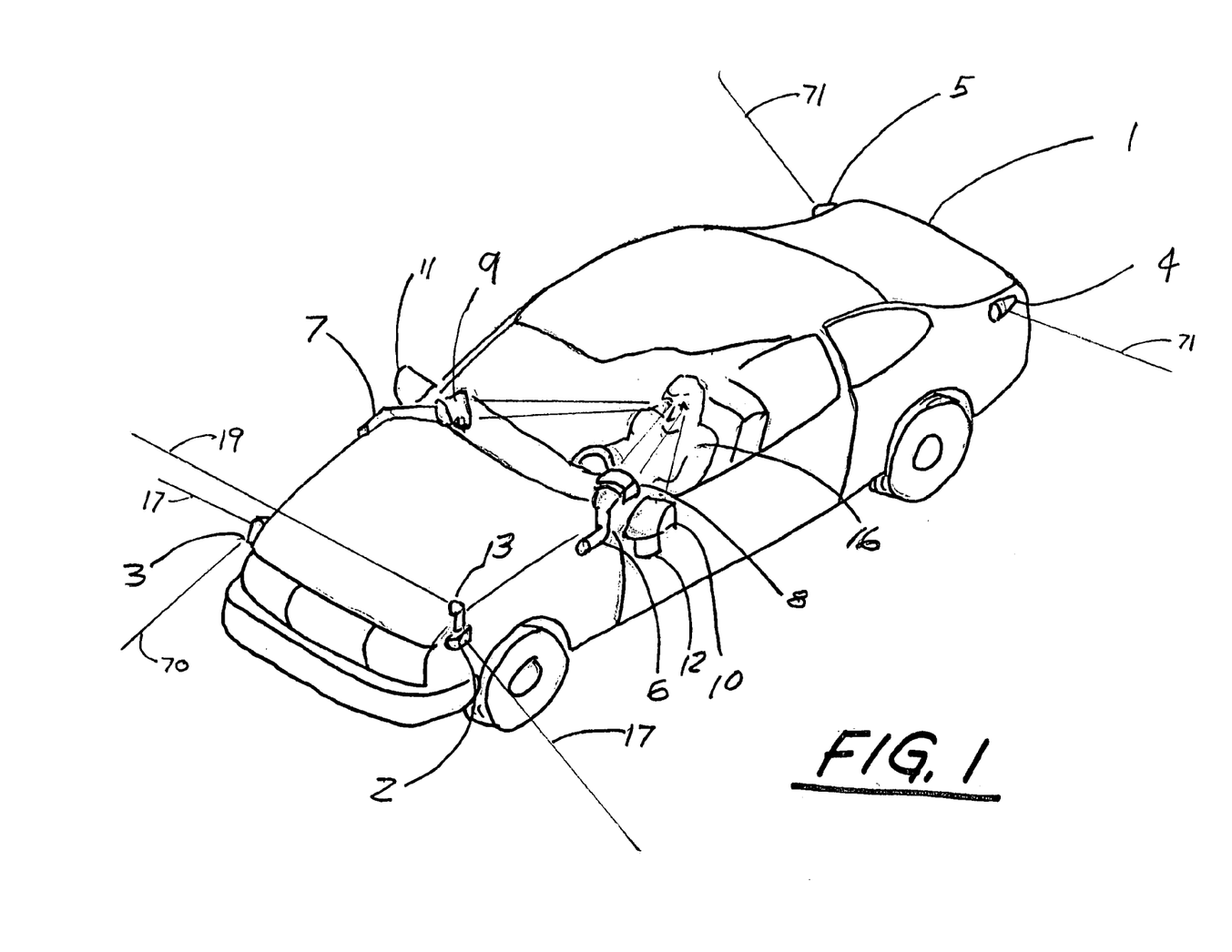
FIG. 1 is a perspective view of vehicle with driver observation system.

Referring now to the drawings, FIG. 1 shows a perspective view of a vehicle 1 with a part of the roof broken away to show the driver 16 operating the vehicle 1. In FIG. 1, the vehicle 1 is depicted as an automobile but the invention is equally suitable for other types of vehicles, including but not limited to vans, trucks, pick-up trucks, and sports utility vehicles.

In FIG. 1, one embodiment of the invention is shown as installed on vehicle 1. A left front corner mirror assembly 2 is located at the left front corner of the vehicle 1, and a right front corner mirror assembly 3 is located at the right front corner of the vehicle 1. Also shown in FIG. 1 is a left rear corner mirror assembly 4 at the left rear corner of the vehicle 1, and a right rear corner mirror assembly 5 at the right rear corner of the vehicle 1. In FIG. 1, these corner mirror assemblies 2, 3, 4 and 5 are shown on the exterior of the vehicle 1, but it is not intended that these assemblies are limited to external installation.

Also depicted in FIG. 1 is a left external lens and mirror base assembly 6 and a left main lens base 8 within the vision of the driver 16. Likewise shown is a right external lens and mirror base assembly 7 and right main lens base 9 within the vision of the driver 16.

On the upper side of the left front corner mirror assembly 2 is shown a periscope assembly 13.

Mounted below the left external rear view mirror housing 10 is a rear lens base assembly 10 within the vision of the driver 16. Although not visible in FIG. 1, a similar rear lens base assembly can be mounted below the right external rear view mirror housing 11 within the vision of the driver 16.

Also shown in FIG. 1 is a first light image 17 entering the left front corner mirror assembly 2, and a second light image 19 entering the periscope assembly 13. On the right side of the vehicle 1 is shown another first light image 17 entering the right front corner mirror assembly 3, along with a straight ahead light image 70, also entering the right front corner mirror assembly 3. A rear first light image 71 is shown entering both rear corner mirror assemblies 4 and 5. It is to be noted that the light images 17, 19, 70 and 71, entering the various assemblies described above are images beyond or out of the line of vision of the driver 16 at the controls of the vehicle 1.

Figure 2:
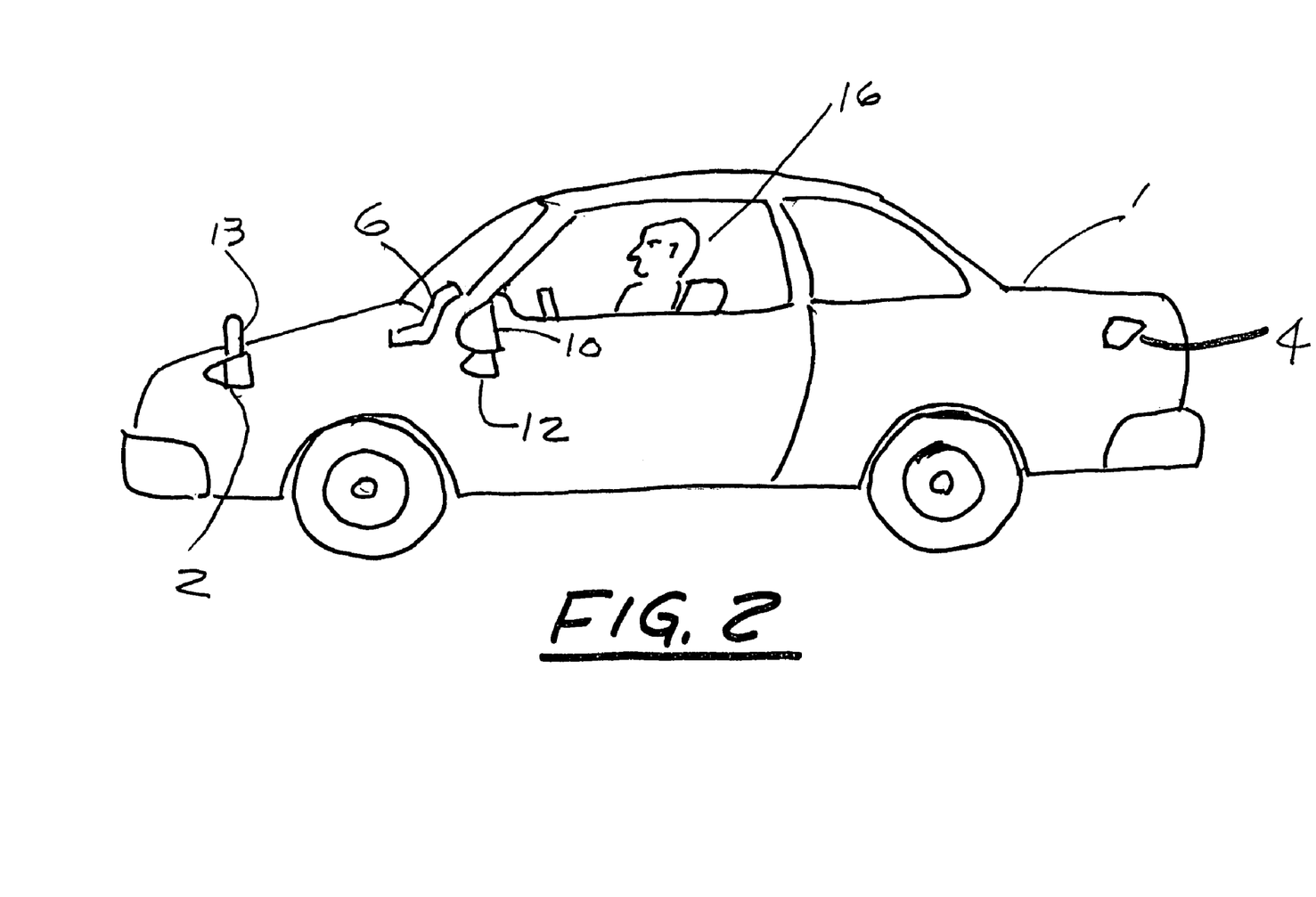
FIG. 2 is a left side view of a vehicle with driver observation system.

FIG. 2 shows a left side view of a vehicle 1 with certain embodiments of the invention. A left front corner mirror assembly 2 is shown on the left front exterior of the vehicle 1, and a left rear corner mirror assembly 4 is shown at the left rear exterior of the vehicle 1. A periscope assembly 13 is also shown mounted on the left front corner mirror assembly 2.

FIG. 2 also shows a left external lens and mirror base assembly 6 and a rear lens base assembly 12 mounted below the left external rear view mirror housing 10 and within the line of vision of the driver 16 operating the vehicle 1.

Figure 3:
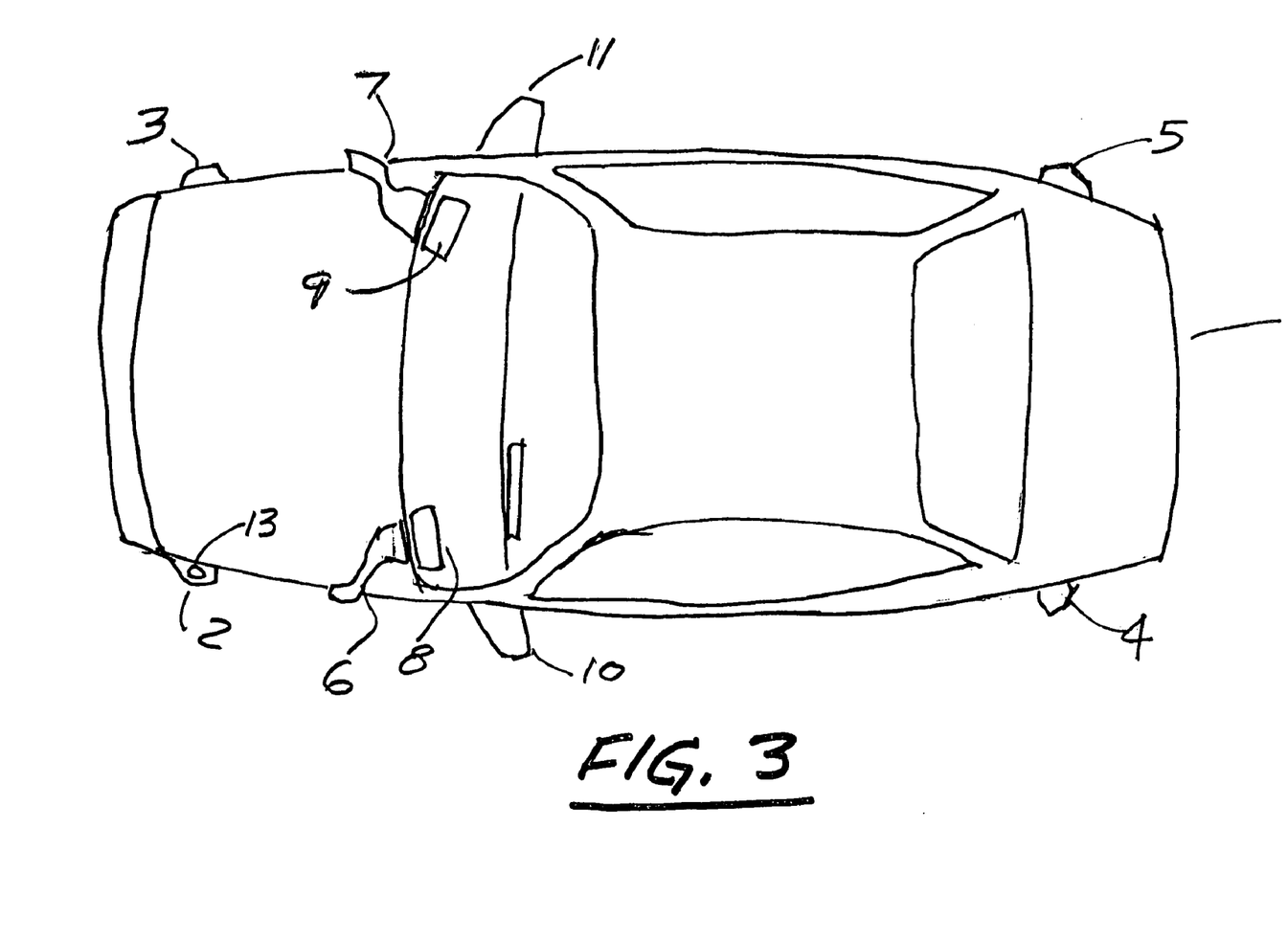
FIG. 3 is a plan view of vehicle with driver observation system.

FIG. 3 shows a plan view of a vehicle 1 with certain embodiments of the invention. A left front corner mirror assembly 2, a right corner mirror assembly 3, a left rear corner mirror assembly 4 and a right rear corner mirror assembly 5, each located at its respective corner of the vehicle 1. A periscope assembly 13 is also shown mounted on the left front corner mirror assembly 2.

Also depicted in FIG. 3 is a left external lens and mirror base assembly 6 and a left main lens base 8 preferably mounted on the dashboard of the vehicle 1 and within the line of vision of the driver 16, not shown in FIG. 3. Likewise, FIG. 3 shows a right external lens and mirror base assembly 7 and a right main lens base 9 preferably mounted on the dashboard of the vehicle 1 and within the line of vision of the driver 16, not shown in FIG. 3.

FIG. 3 also shows a left external rear view mirror housing 10 and a right external rear view mirror housing 11, each of which could have a rear lens base assembly 12 mounted underneath and within the line of vision of the driver 16, although not visible in FIG. 3.

Figure 4:
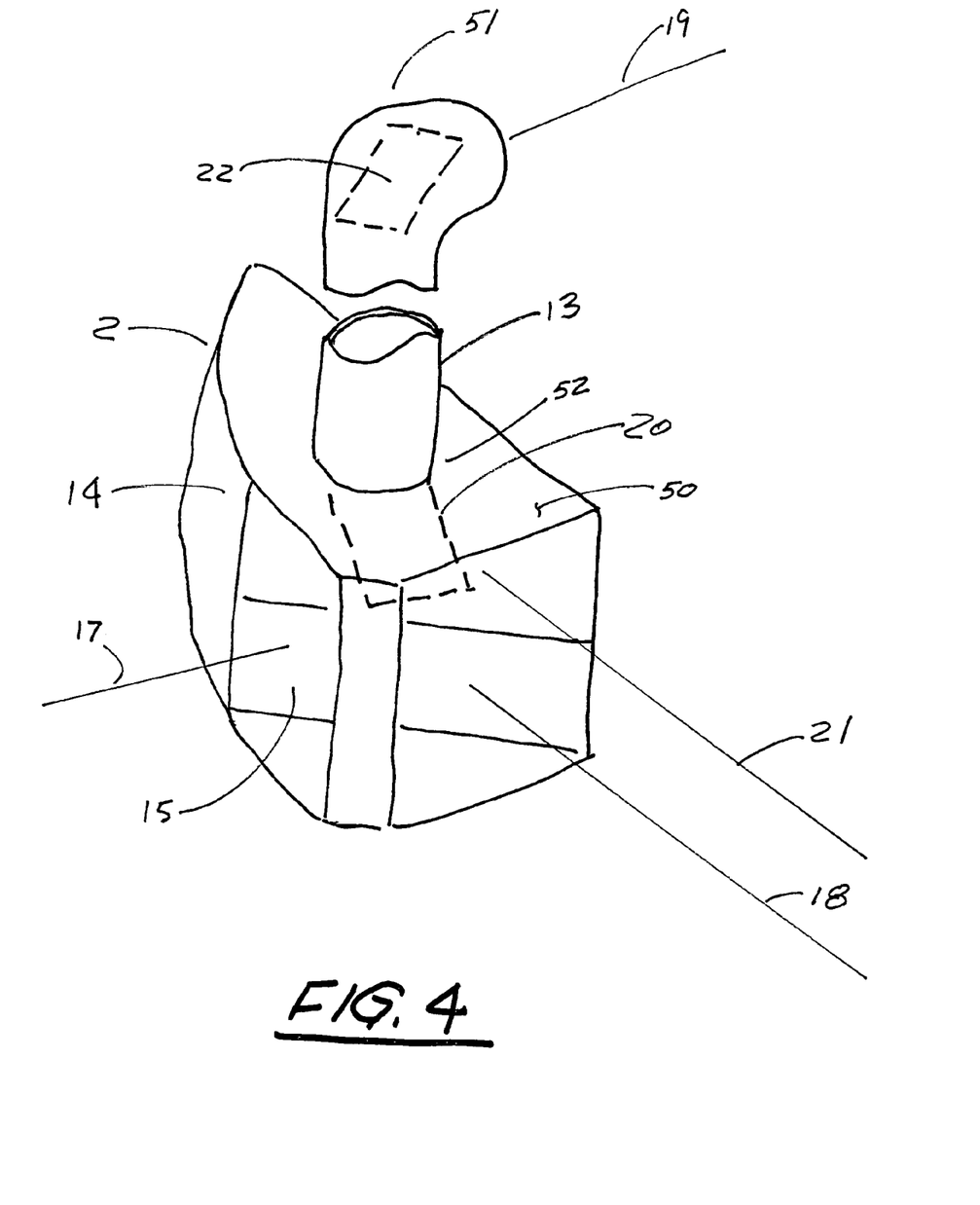
FIG. 4 is a perspective view of left front corner mirror assembly with periscope.

FIG. 4 shows a perspective view of the left front corner mirror assembly 2 with a periscope assembly 13 attached. As depicted, the left front corner mirror assembly 2 is located externally at the left front corner of the vehicle 1, but this assembly could be mounted in an internal location such as a headlight or parking light assembly with transparent housing to allow the passage of a light image to reach the mirror assembly. In this external depiction, the left front corner mirror assembly 2 has an aerodynamic cover 14 with an upper planar side 50.

The left front corner mirror assembly 2 is fitted with a primary mirror 15 to receive a first light image 17 not within the vision of the driver 16 of the vehicle 1, and to reflect that first light image 17 as a first reflected light image 18 towards the left external lens and mirror base assembly 6 depicted in FIGS. 1, 2 and 3 and as more fully detailed below.

A periscope assembly 13 is shown in FIG. 4 attached to and through the upper planar side 50 of the left front corner mirror assembly 2. The periscope assembly 13 as depicted is oriented to receive a second light image 19 not within the vision of the driver 16 of the vehicle 1 and to ultimately reflect that second light image 19 as a second reflected light image 21 towards the left external lens and mirror base assembly 6 depicted in FIGS. 1, 2 and 3 and as more fully detailed below. Within the periscope assembly 13 is a top periscope mirror 22 to receive and reflect the second light image 19 towards a bottom periscope mirror 20, which in turn would receive and reflect the second light image 19 as a second reflected light image 21 towards the left external lens and mirror base assembly 6. It is understood that the height of the periscope would be adequate to allow a second light image 19 to be received over the hood of the vehicle 1 and the orientation of the periscope assembly 13 could be adjusted to optimize the benefits of the invention according to the size and dimensions of the vehicle. In an alternative embodiment the periscope may be mounted on another surface of the left corner mirror assembly 6 such that the second light image 19 could be received from any other direction. Likewise, the orientation or placement of the primary mirror 15 could be adjusted to optimize the benefits of the invention. It is not intended that either the first light image 17 or the second light image 19 be in exact opposite directions or be limited to a perpendicular direction in relation to the longitudinal axis of the vehicle 1. As will be illustrated further, the orientation of the light images may be set in a more forward direction to enhance the vision of the driver 16 in certain traffic situations.

Figure 5:
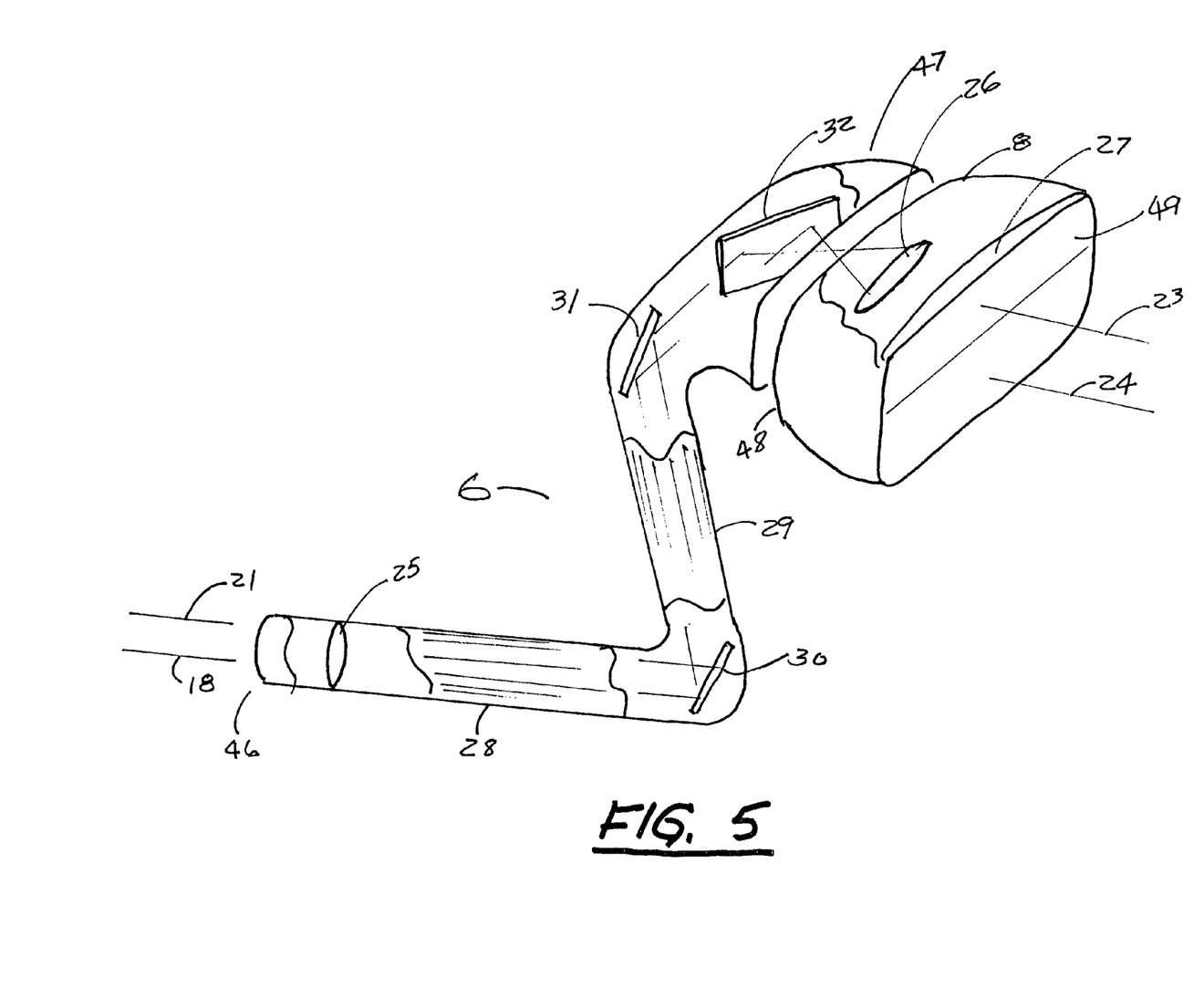
FIG. 5 is a perspective view of left external lens and mirror base assembly and left main lens base with parts broken away in section to show placement of lens and mirrors.

FIG. 5 shows a perspective view of a left external lens and mirror base assembly 6 and a left main lens base 8 with parts broken away in section to show placement of lens and mirrors. The left external lens and mirror base assembly 6 has a receiving end 46 and a transmitting end 47 and as depicted in FIG. 5 has a first shaft 28 and a second shaft 29. At the receiving end 46 the left external lens and mirror base assembly 6 receives the first reflected image 18 and the second reflected image 21 from the left front corner mirror assembly. In the arrangement depicted in FIG. 5, the first reflected image 18 and the second reflected image 21 are received by a first lens 25 in proximity to the receiving end 46. The reflected images 18 and 21 passing through the first lens 25 are received and reflected by a first shaft mirror 30 toward a second shaft mirror 31 which reflects the reflected images 18 and 21 toward a third shaft mirror 32 which reflects the reflected images 18 and 21 toward the transmitting end 47 of the left external lens and mirror base assembly 6. The reflected images 18 and 21 would then exit the transmitting end 47 and enter the receiving side 48 of the left main lens base 8 and pass through a second lens 26 and be transmitted to the final lens 27 at the display side 19 of the left main lens base 8 and within the vision of the driver 16 operating the vehicle 1. The image delivered to the display side 49 would be split with a final image 23 from the second light image 19 and a final image 24 from the first light image 17, one above and one below.

As shown in FIG. 5, the transmitting end 47 of the left external lens and mirror base assembly 6 rests upon the exterior surface of the windshield of the vehicle 1 and the receiving end 48 of the left main lens base 8 rests upon the interior surface of the windshield in proximity of or upon the dashboard of the vehicle 1 within the vision of the driver 16. The reflected images 18 and 21 leaving the transmitting end 47 of the left external lens and mirror base assembly 6 pass through the windshield and enter the receiving end 48 of the left main lens base 8.

While the arrangement depicted in FIG. 5 shows the first lens 25 in proximity of the receiving end 46, the location of the first lens 25 within the left external lens and mirror base assembly 6 may vary according to the specific dimensions and configuration suitable to a particular vehicle. Likewise the type of lens or lens arrangement and the location of mirrors may vary according to the specific dimensions and configuration suitable to a particular vehicle. The first lens 25 shown in FIG. 5 is generally displayed as a conventional double convex or converging lens which would invert the images received, thereby requiring a second lens 26 to turn the image back to right side up before transmitting to the final lens 27 for the magnification needed to provide a display readily seen by the driver 16. Instead of this conventional lens arrangement, there are alternative lens arrangements such as the "Galilean telescope" involving a convergent and a divergent lens without the need for an intermediate or third lens to right the image.

Figure 6:
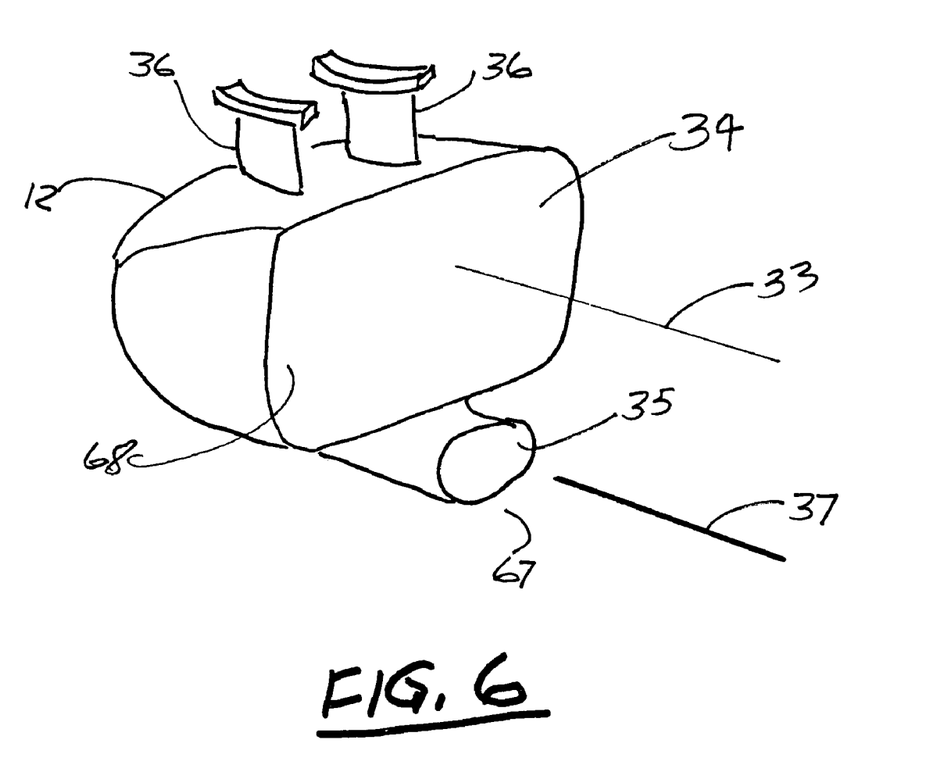
FIG. 6 is a perspective view of rear lens base.

FIG. 6 shows a perspective view of a rear lens base assembly 12 suitable for mounting beneath an external rear-view mirror housing 10 or 11 with struts 36. The rear lens base has a receiving end 67 and a display side 68 within the vision of the driver 16 operating the vehicle 1. Although not shown in this FIG. 6, a rear corner mirror assembly, 4 or 5, receives a first light image 71 outside the vision of the driver 16. The first light image 71 is received and reflected by a primary mirror in the rear corner mirror assembly, 4 or 5 and reflected forward as reflected image 37. The reflected image 37 is received at the receiving end 67 of the rear lens base assembly 12 by first lens 35 and ultimately is displayed as a final image 33 through the final lens 34 at the display side 68 within the vision of the driver 16. The arrangement shown in FIG. 6 would be equally applicable to the right or left side of a vehicle fitted with external rear-view mirror housings.

Figure 7:
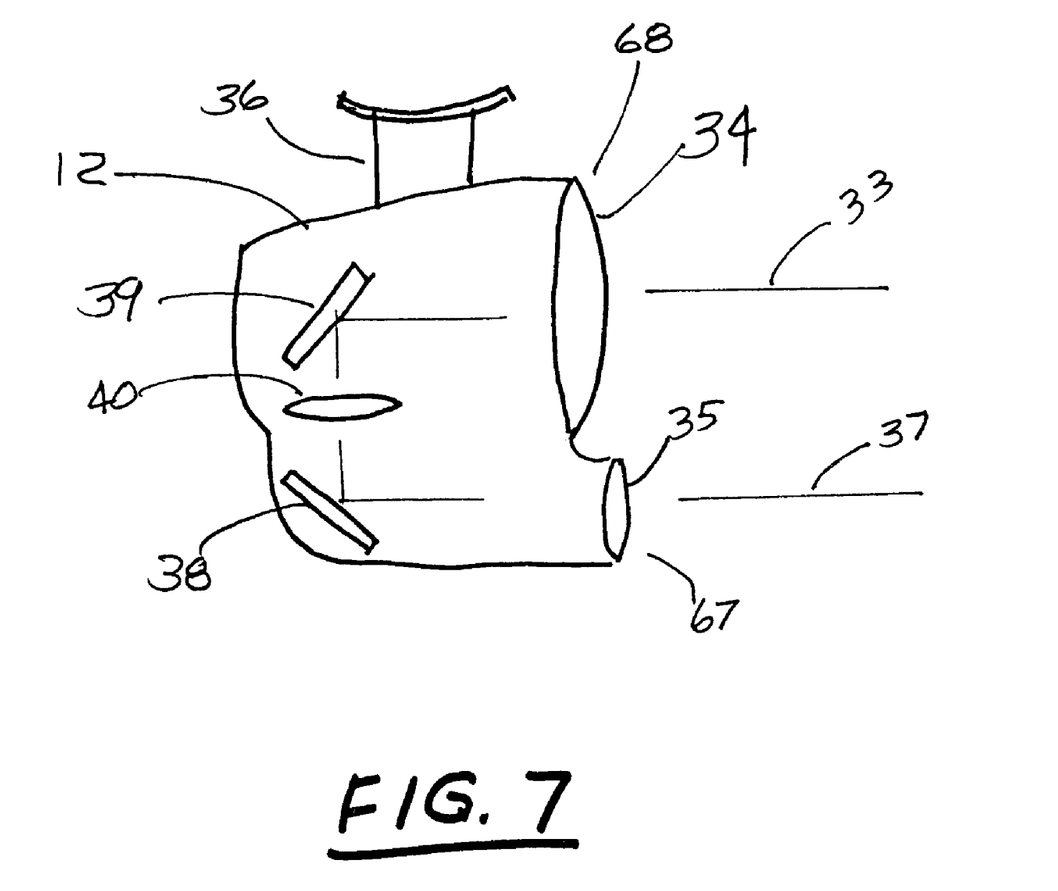
FIG. 7 is a cross section of rear lens base.

FIG. 7 shows a cross section of a rear lens base assembly 12 as previously shown in FIG. 6. The reflected image 37 enters the rear lens base assembly 12 at the receiving end 67 and passes through a first lens 35 from which the reflected image is received and reflected by a first mirror 38 and transmitted through a second lens 40 to a second mirror 39 from which the reflected image is then transmitted to and through a final lens 34 at the display side 68 of the rear lens base 12 within the vision of the driver 16. Also provided are struts 36 for attachment to an external rear view mirror housing 10 or 11. As alternative lens types and arrangements would be suitable for the external lens and mirror base assemblies 6 and 7 and the main lens bases 8 and 9, so too would alternative lens types and arrangements be applicable to the rear lens base 12.

Figure 8:
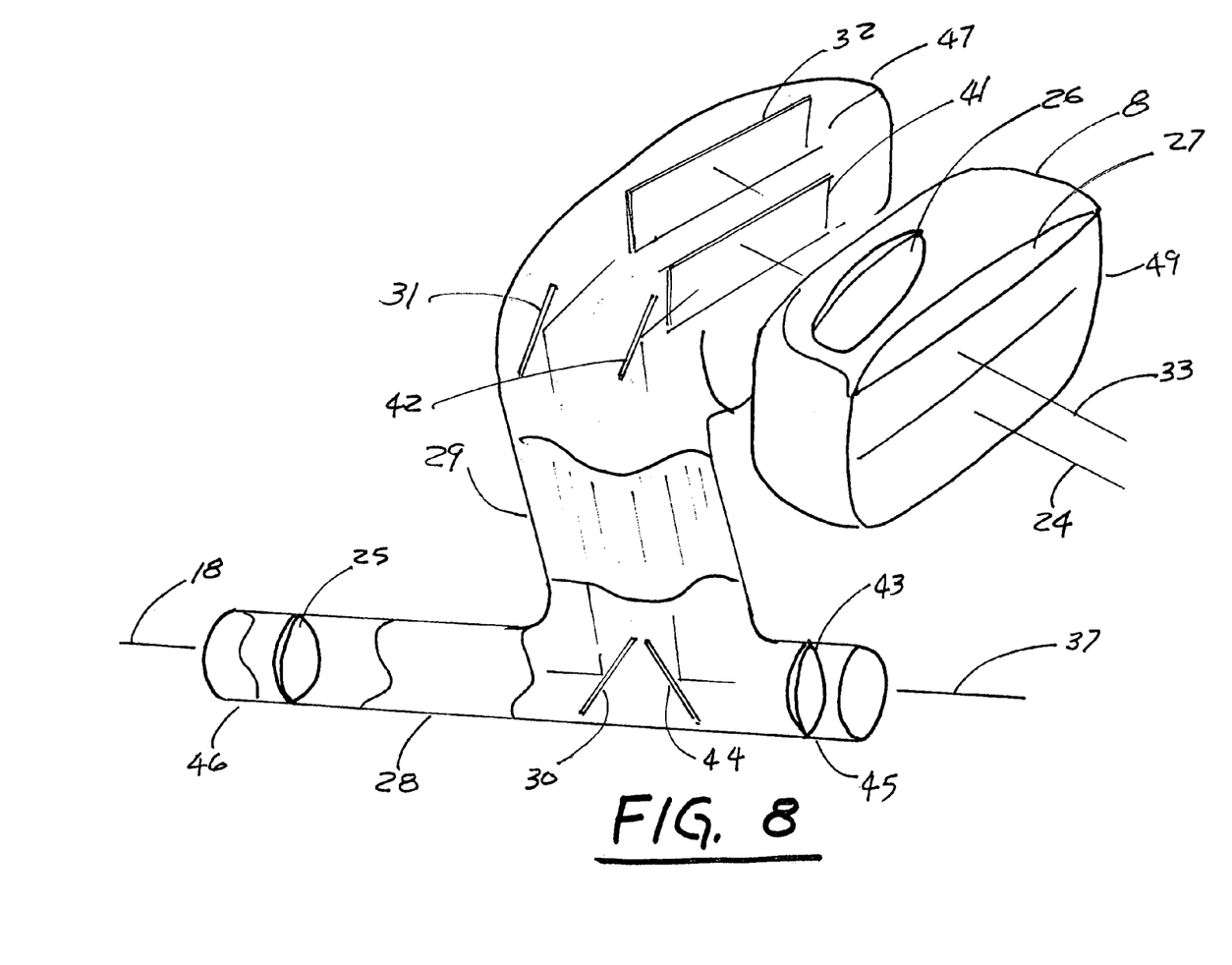
FIG. 8 is a perspective view of an alternative embodiment of left external lens and mirror base assembly and left main lens base with parts broken away to show placement of lens and mirrors.

FIG. 8 shows a perspective view of an alternative embodiment of left external lens and mirror base assembly 6 and main lens base 8 with parts broken away to show placement of lens and mirrors. The arrangement depicted in FIG. 8 would eliminate the need for a rear lens base assembly 12 as shown in FIGS. 6 and 7, in that the reflected image 37 from the left rear corner mirror assembly 4 towards the rear shaft 45 of the left external lens and mirror base assembly 6 and received by a first rear lens 43. From the first rear lens 43, the reflected image 37 would be received and reflected by a first rear shaft mirror 44 toward a second rear shaft mirror 42 which would receive and reflect the reflected image 37 to a third rear shaft mirror 41 which reflects the reflected image 37 toward the transmitting end 47 of the left external lens and mirror base assembly 6. The reflected image 37 would then exit the transmitting end 47 and enter the receiving side 48 of the left main lens base 8 and pass through a second lens 26 and be transmitted to the final lens 27 at the display side 19 of the left main lens base 8 and within the vision of the driver 16 operating the vehicle 1. The image delivered to the display side 49 would be split with a final image 33 from the reflected image 37 and a final image 24 from the first reflected image 18, one above and one below. In this arrangement for the sake of simplicity only one reflected image 18 is shown being received at the receiving end 46. However a second reflected image 21 could also be received and displayed as a final image 23 by expanding the dimensions of the final lens 27.

Figure 11:
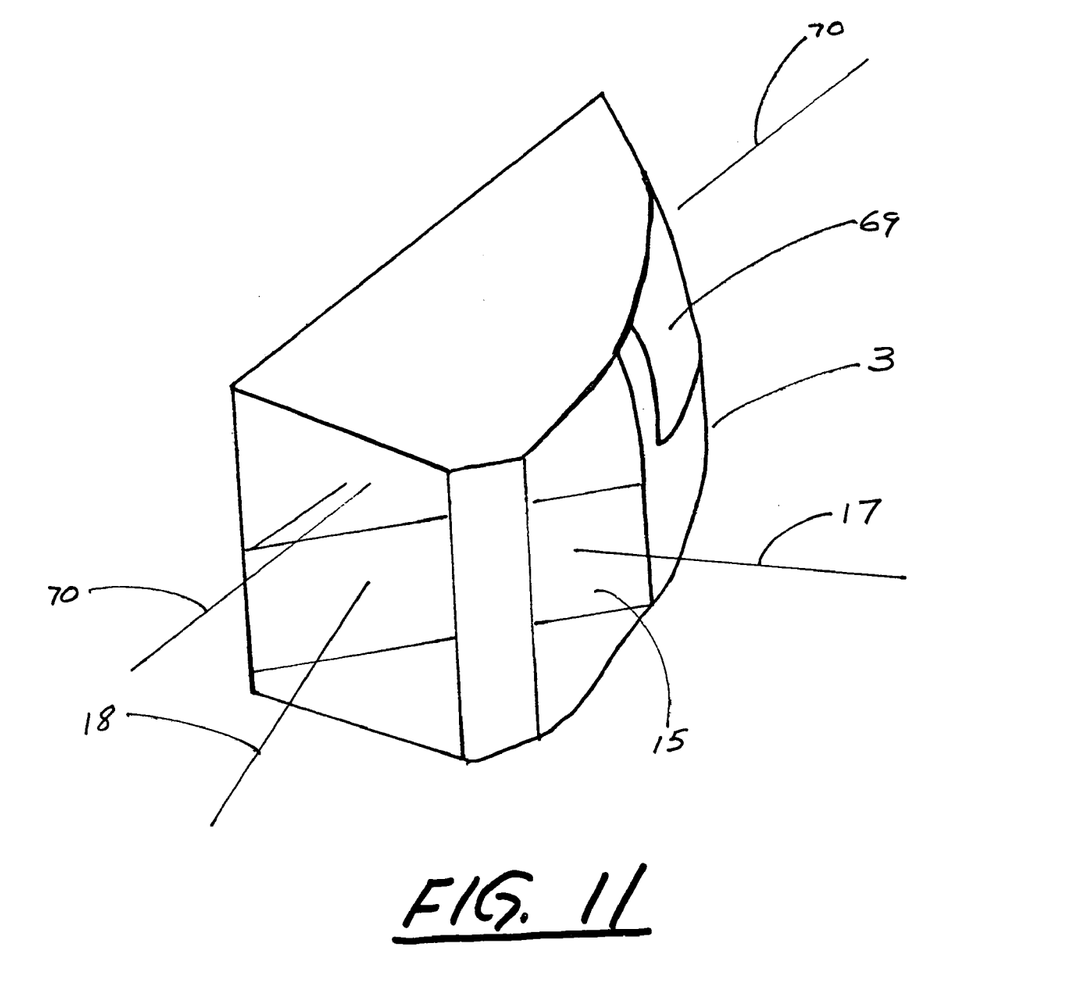
FIG. 11 is a perspective view of right front corner mirror assembly with front aperture.

FIG. 11 shows a perspective view of a right front corner mirror assembly 3 with a front aperture 69. Like the left front corner mirror assembly 2 shown in FIGS. 1, 2 and 3 and detailed in FIG. 4, the right front corner mirror assembly 3 is fitted with a primary mirror 15 to receive a first light image 17 not within the vision of the driver 16 of the vehicle 1, and to reflect that first light image 17 as a first reflected light image 18 towards the right external lens and mirror base assembly 7. Unlike the embodiment of the front corner mirror assembly 2, the right front corner mirror assembly 3 has a front aperture 69 which allows a straight ahead light image 70 to pass through the right front corner mirror assembly 3 towards the right external lens and mirror base assembly 7 along with the first reflected light image 18 to be received at the receiving end of the right external lens and mirror base assembly 7 and be transmitted to the right main lens base 9 within the vision of the driver 16 of the vehicle 1. Although shown on the right front corner mirror assembly 3, this arrangement with a front aperture 69 is equally applicable to the left front corner mirror assembly 2.

Figure 12:
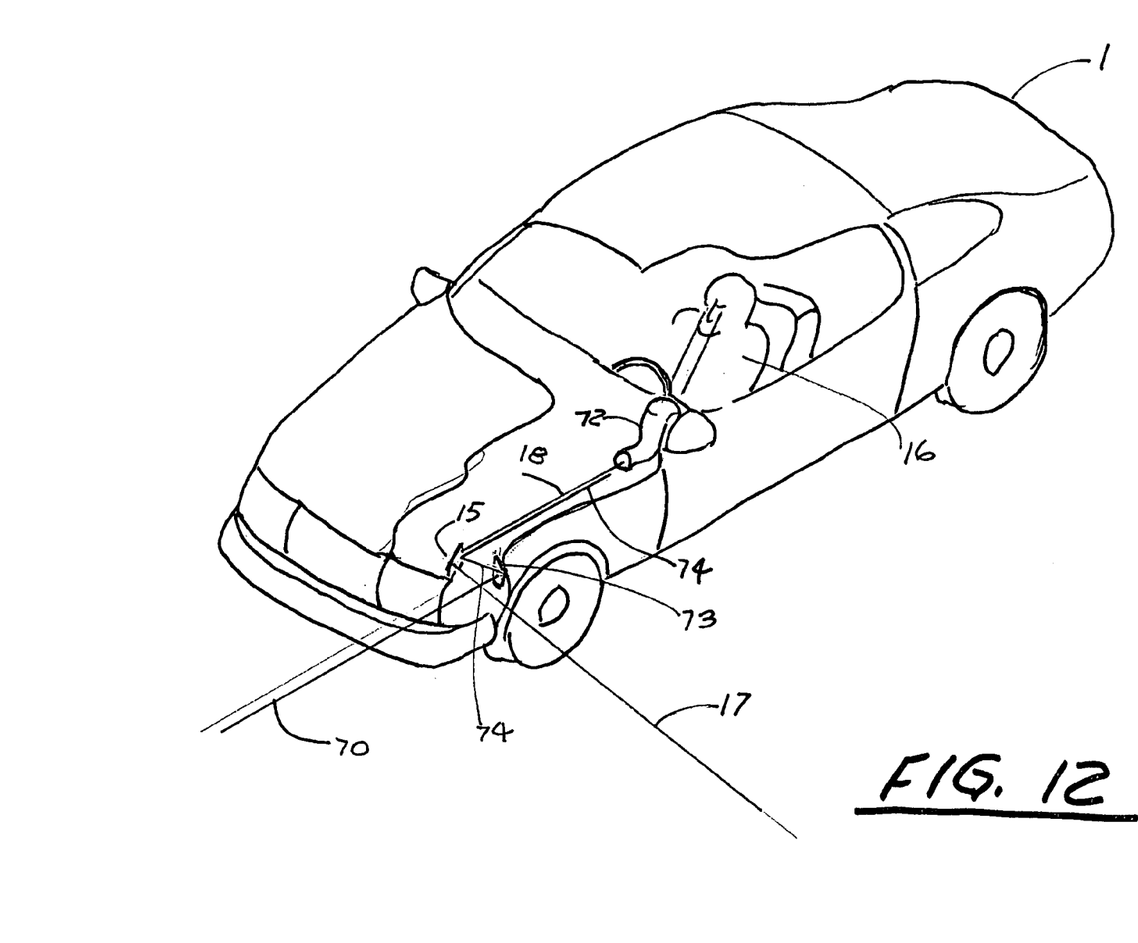
FIG. 12 is a perspective view of a vehicle with parts broken away to show the internal installation of a driver observation system.

FIG. 12 shows a perspective view of a vehicle 1 with parts broken away to show the internal installation of the invention. In this embodiment the first light image 17 is received and reflected by a primary mirror 15 mounted within the vehicle 1, preferably behind a transparent headlight or parking light covering. The first reflected image 18 is transmitted to a left internal lens and mirror base assembly 72 which would include an integral main lens base similar in function to the left main lens base 8 used in connection with a left external lens and mirror base assembly 6, terminating in a display side within the vision of the driver 16. Also shown in this embodiment is a straight ahead light image mirror 73 to receive and reflect a straight ahead light image 70 as a straight ahead reflected image 74 to the primary mirror 15 and reflected along with the first reflected image 18 to the left internal lens and mirror base assembly 72 to terminate in a split display within the vision of the driver 16.

Figure 9:
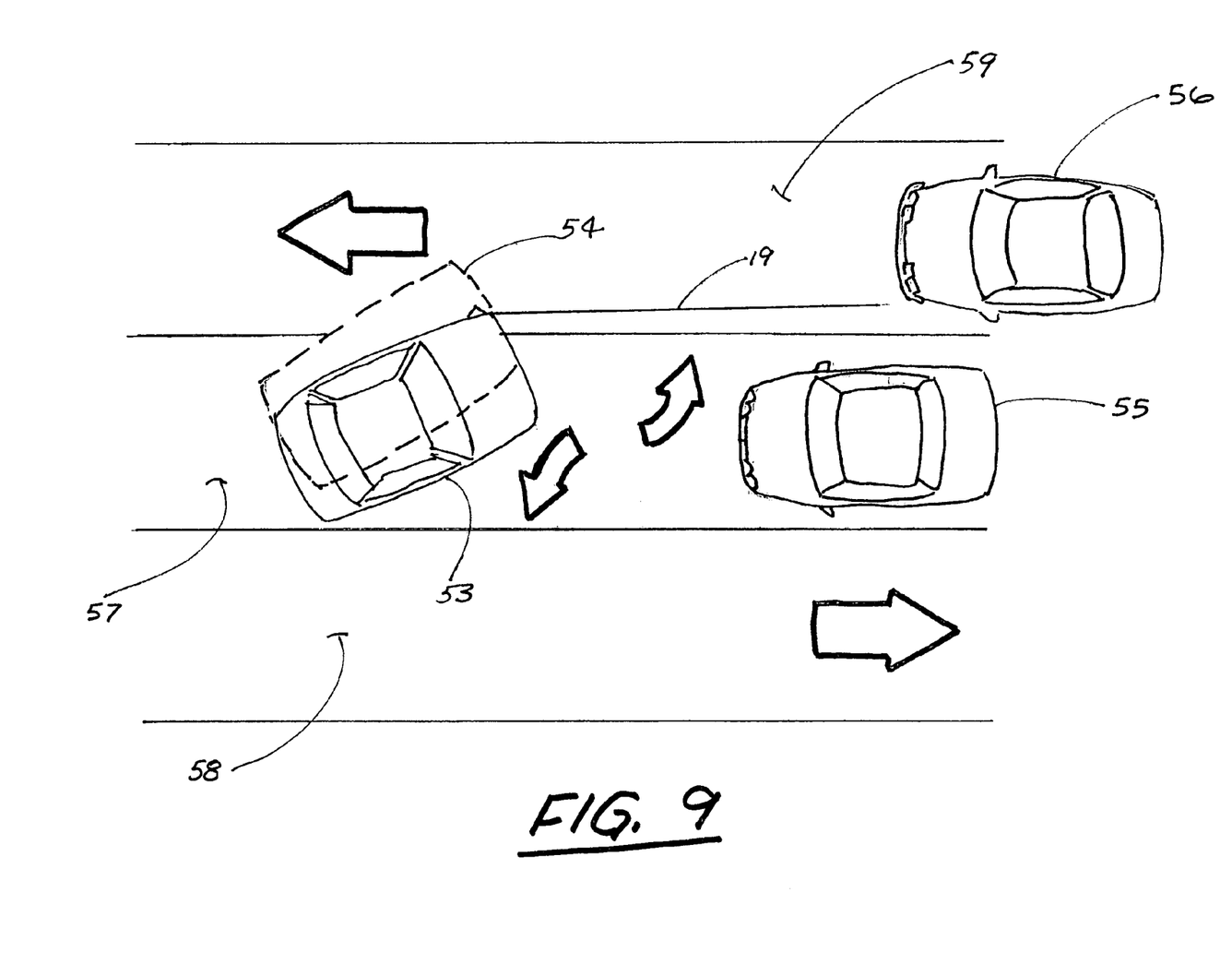
FIG. 9 is a plan view of vehicle with driver observation system in left turn situation in common turning lane.

FIG. 9 shows a plan view of a vehicle 53 with the invention attempting a left turn from a common turning lane 57 across an oncoming traffic lane 59 with an oncoming vehicle 56 while facing an opposing turning vehicle 55 in the common turning lane 57. In this depiction, the vehicle 53 will have moved from the traffic lane 58 into the common turning lane 57 to turn left across the opposing lane 59. In this situation the driver of vehicle 53 would have a clear view of oncoming traffic in lane 59 except for the opposing vehicle 55 coming in the opposite direction and attempting a left turn across traffic lane 58. At this point, the driver of vehicle 53 must nose the vehicle out into the oncoming lane to see any oncoming vehicles 56. When equipped with the driver observation system, the left front corner of the vehicle 53 need only extend slightly to the left so that a second light image 19 would be received at the left front corner mirror assembly and transmitted to the vision of the driver. In contrast, a vehicle 54 without the invention would have to turn into the oncoming traffic lane 59 a sufficient distance to allow the driver to see the oncoming traffic from the controls of the vehicle. This increased distance could be enough to cause an accident.

Figure 10:
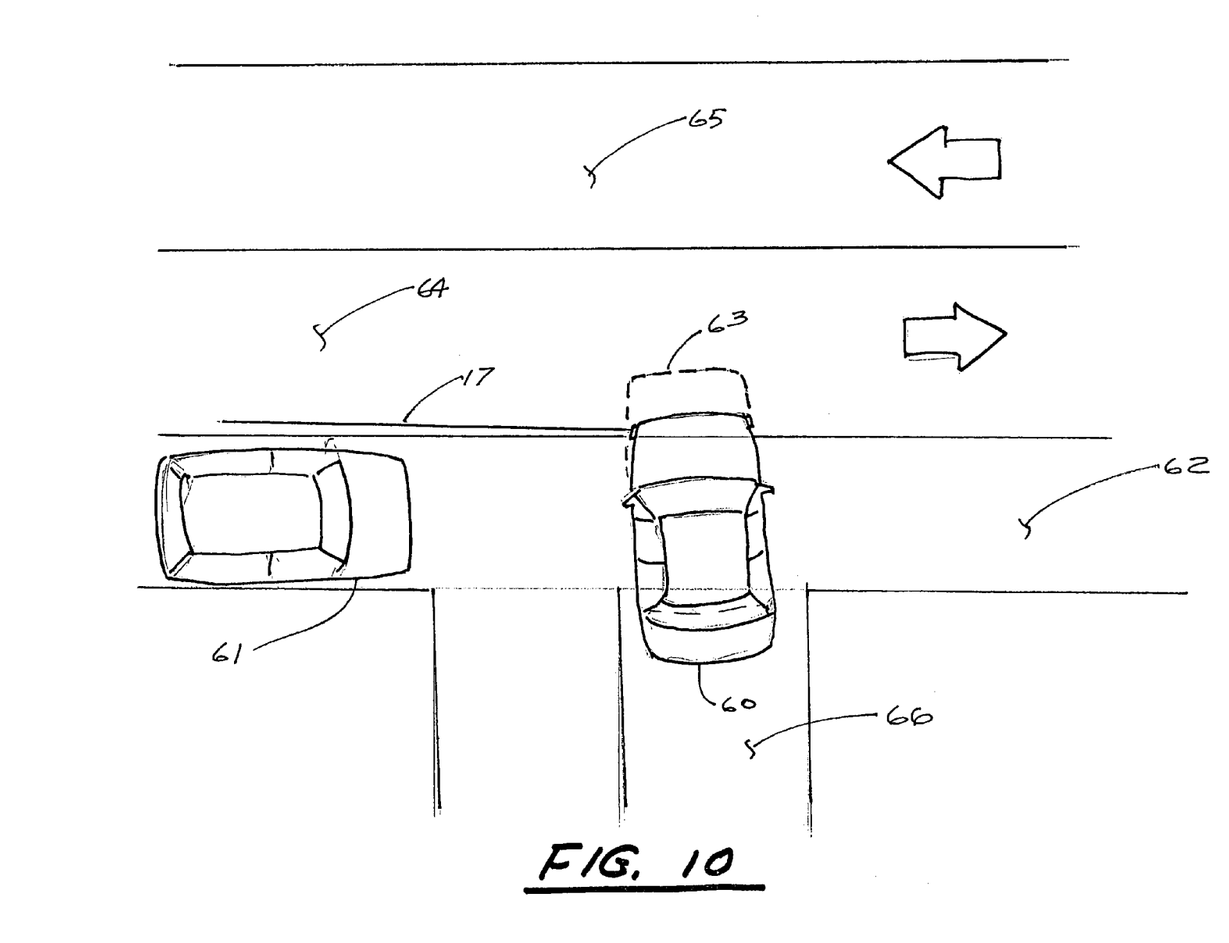
FIG. 10 is a plan view of vehicle with driver observation system attempting to turn into cross street.

FIG. 10 shows a plan view of a vehicle 60 with the invention attempting to turn left onto an intersecting street from a cross street 66 by crossing an opposing lane 64 to reach a merging lane 65. A parked vehicle 61 obstructs the vision of the driver of vehicle 60. When equipped with the driver observation system, vehicle 60 need only proceed slightly forward to receive a first light image 17 at the left front corner mirror assembly and have that image transmitted to the driver. In contrast, a vehicle 63 without the invention would have to proceed almost half the length of the vehicle forward to allow the driver to see oncoming traffic.

I claim:

1. A driver observation system for use with a driver-operated vehicle, said driver observation system comprising;
   a) at least one corner mirror assembly at a front corner of the vehicle with a primary mirror to receive and reflect a light image not within the vision of the driver;
   b) a lens and mirror base assembly with a receiving end and a transmitting end, with a first lens in proximity of the receiving end to receive the light image reflected from the primary mirror in the front corner mirror assembly, a first mirror to receive and transmit the light image from the first lens, and at least a second mirror to receive the light image from the first mirror and transmit the light image through the lens and mirror base assembly and towards the transmitting end;
   c) a main lens base with a receiving side and a display side within the vision of the driver, with a second lens to receive the light image transmitted from the transmitting end of the lens and mirror base assembly, a final lens to receive the light image transmitted through the second lens and transmit the light image to the display side of the main lens base within the vision of the driver.

2. A driver observation system for use with a driver-operated vehicle, said driver observation system comprising;
   a) at least one corner mirror assembly at a front corner of the vehicle with a primary minor to receive and reflect a first light image not within the vision of the driver where the corner mirror assembly has a covering with an upper planar side;
   b) a periscope assembly with a top end and a bottom end, with said bottom end attached to and through the upper planar side of the front corner mirror assembly covering, with the top end rising above the upper planar side of the corner mirror assembly covering, with a top mirror mounted in the periscope assembly at the top end to receive a second light image not within the vision of the driver and from a different direction than the first light image received by the primary mirror within the front corner mirror assembly, with a bottom mirror mounted at the bottom end of the periscope assembly within the corner mirror assembly to receive the second light image reflected from the top mirror and transmit the second light image in the same direction and path as the first light image reflected from the mirror;
   c) a lens and mirror base assembly with a receiving end and a transmitting end, with a first lens in proximity of the receiving end to receive the first light image reflected from the primary mirror in the front corner mirror assembly and the second light image reflected from the bottom mirror of the periscope, a first mirror to receive the first and second light images from the first lens and transmit the first and second light images, and at least a second mirror to receive the first and second light images from the first mirror and sit the first and second light images through the lens and mirror base assembly and towards the transmitting end;
   d) a main lens base with a receiving side and a display side within the vision of the driver, with a second lens to receive the first and second light images transmitted from the transmitting end of the lens and minor base assembly, a final lens to receive the first and second light images transmitted through the second lens and transmit the first and second light images to the display side of the main lens base within the vision of the driver.

3. A driver observation system for use with a driver-operated vehicle according to claim 1, further comprising;
   a) at least one corner mirror assembly at a rear corner of the vehicle with a primary mirror to receive and reflect a light image not within the vision of the driver;
   b) a rear lens base assembly with a receiving end and a display side, with a first lens in proximity of the receiving end to receive the light image reflected from the primary mirror in the rear corner mirror assembly, a fist mirror to receive and transmit the light image from the first lens, a second lens to receive the light image transmitted from the first mirror, a second mirror to receive and transmit the light image from the second lens, and a final lens to receive the light image from the second mirror and transmit the light image to the display side of the rear lens base assembly within the vision of the driver.

4. A driver observation system for use with a driver-operated vehicle according to claim 2, further comprising;
   a) at least one corner mirror assembly at a rear corner of the vehicle with a primary mirror to receive and reflect a light image not within the vision of the driver;
   b) a rear lens base assembly with a receiving end and a display side, with a first lens in proximity of the receiving end to receive the light image reflected from the primary mirror in the rear corner mirror assembly, a first mirror to receive and transmit the light image from the first lens, a second lens to receive the light image transmitted from the first mirror, a second mirror to receive and transmit the light image from the second lens, and a final lens to receive the light image from the second mirror and transit the light image to the display side of the rear lens base assembly within the vision of the driver.

5. A driver observation system for use with a driver-operated vehicle, said driver observation system comprising;
   a) at least one corner mirror assembly at a rear corner of the vehicle with a primary mirror to receive and reflect a light image not within the vision of the driver;
   b) a rear lens base assembly with a receiving end and a display side, with a first lens in proximity of the receiving end to receive the light image reflected from the primary mirror in the rear corner mirror assembly, a first mirror to receive and transmit the light image from the first lens, a second lens to receive the light image transmitted from the first mirror, a second mirror to receive and transmit the light image from the second lens, and a final lens to receive we light image from the second mirror and transmit the light image to the display side of the rear lens base assembly within the vision of the driver.

6. A driver observation system for use with a driver-operated vehicle, said driver observation system comprising;

a) at least one corner mirror assembly at a front corner of the vehicle to receive and transmit at least one light image not within the vision of the driver;
b) a lens and mirror base assembly with a receiving end and a transmitting end, with a first lens interposed between the receiving end and the transmitting end to receive at least one light image from the front corner mirror assembly and at least one mirror to direct the light image through the lens and mirror base assembly from the receiving end to the transmitting end;
c) a main lens base with a receiving side and a display side within the vision of the driver, with a second lens to receive the light image transmitted from the transmitting end of the lens and mirror base assembly, a final lens to receive the light image transmitted through the second lens and transit the light image to the display side of the main lens base within the vision of the driver.

7. A driver observation system for use with a driver-operated vehicle according to claim 6, further comprising;
a) at least one corner mirror assembly at a rear corner of the vehicle with a primary mirror to receive and reflect a light image not within the vision of the driver;
b) a rear lens base assembly with a receiving end and a display side with at least one lens interposed between the receiving end and the display side to receive at least one light image from the rear corner mirror assembly and at least one mirror to direct the light image through the rear lens base assembly, and a final lens to receive and transmit the light image to the display side of the rear lens base assembly within the vision of the driver.

8. A driver observation system for use with a driver-operated vehicle having at least one external rear view mirror housing, said driver observation system comprising;
a) at least one corner mirror assembly at a rear corner of the vehicle apart from the external rear-view mirror housing with a primary mirror to receive and reflect a light image not within the vision of the driver;
b) a rear lens base assembly with a receiving end and a display side with at least one lens interposed between the receiving end and the display side to receive at least one light image from the rear corner mirror assembly and at least one mirror to direct the light image through the rear lens base assembly, and a final lens to receive and transmit the light image to the display side of the rear lens base assembly within the vision of the driver.

9. A driver observation system for use with a driver-operated vehicle having at least one external rear view mirror housing, said driver observation system comprising;
a) at least one corner mirror assembly at a front corner of the vehicle apart from the external rear view mirror housing to receive and transmit at least one light image not within the vision of the driver;
b) a lens and mirror base assembly with a receiving end and a transmitting end, with a first lens interposed between the receiving end and the transmitting end to receive at least one light image from the front corner mirror assembly and at least one or to direct the light image through the lens and mirror base assembly from the receiving end to the transmitting end;
c) a main lens base with a receiving side and a display side within the vision of the driver, a final lens to receive the light image transmitted from the lens and mirror base assembly and transmit the light image to the display side of the main lens base within the vision of the driver.

\* \* \* \* \*